United States Patent [19]

Henson

[11] 4,398,523

[45] Aug. 16, 1983

[54] FUEL CONSERVATION DEVICE

[76] Inventor: Dennis R. Henson, Rte. 3, Eufala, Okla. 74432

[21] Appl. No.: 208,070

[22] Filed: Nov. 18, 1980

[51] Int. Cl.³ .................................... F02M 31/00
[52] U.S. Cl. ................................ 123/557; 123/549; 261/142
[58] Field of Search ............... 123/575, 578, 557, 525, 123/549, 522, 523; 261/16, DIG. 83, 142

[56] References Cited

U.S. PATENT DOCUMENTS

| | | | |
|---|---|---|---|
| 2,150,764 | 3/1939 | Farineau | 123/525 |
| 2,285,905 | 6/1942 | Cunningham | 261/16 |
| 2,315,881 | 4/1943 | Thomas | 123/525 |
| 2,315,882 | 4/1943 | Tremble | 123/525 |
| 2,333,167 | 11/1943 | Garretson | 261/16 |
| 2,339,988 | 1/1944 | Gerson | 123/525 |
| 2,343,488 | 3/1944 | Thomas | 261/16 |
| 2,982,528 | 5/1961 | Shelton | 261/142 |
| 3,713,429 | 1/1973 | Dwyre | 123/522 |
| 3,792,688 | 2/1974 | Grainger | 123/549 |
| 4,044,742 | 8/1977 | Linder | 123/549 |
| 4,092,963 | 6/1978 | Vrooman | 123/557 |
| 4,259,937 | 4/1981 | Elliot | 123/557 |
| 4,306,531 | 12/1981 | Watkins | 123/557 |

Primary Examiner—Ronald H. Lazarus
Attorney, Agent, or Firm—Head, Johnson & Stevenson

[57] ABSTRACT

A fuel conservation device for internal combustion engines of vehicles, or the like, comprising a housing interposed between the usual fuel pump and carburetor of the engine, the housing having two compartments, a heating element disposed in one of the compartments, the other of said compartments having an inlet in communication with the fuel pump for receiving raw fuel therefrom and an outlet for discharging vaporized fuel therefrom, a level control device disposed in the second mentioned compartment for controlling the fluid level therein, a secondary carburetor interposed between the housing and the carburetor of the engine and in communication with the outlet of the housing and the throat of the usual carburetor for directing the vaporized fuel into the carburetor for passage therethrough to the engine combustion chamber, the heating element providing heat for the second compartment for vaporization of the fuel therein whereby substantially completely vaporized fuel is delivered to the combustion chamber to increase the fuel efficiency and reduce exhaust pollutants.

1 Claim, 1 Drawing Figure

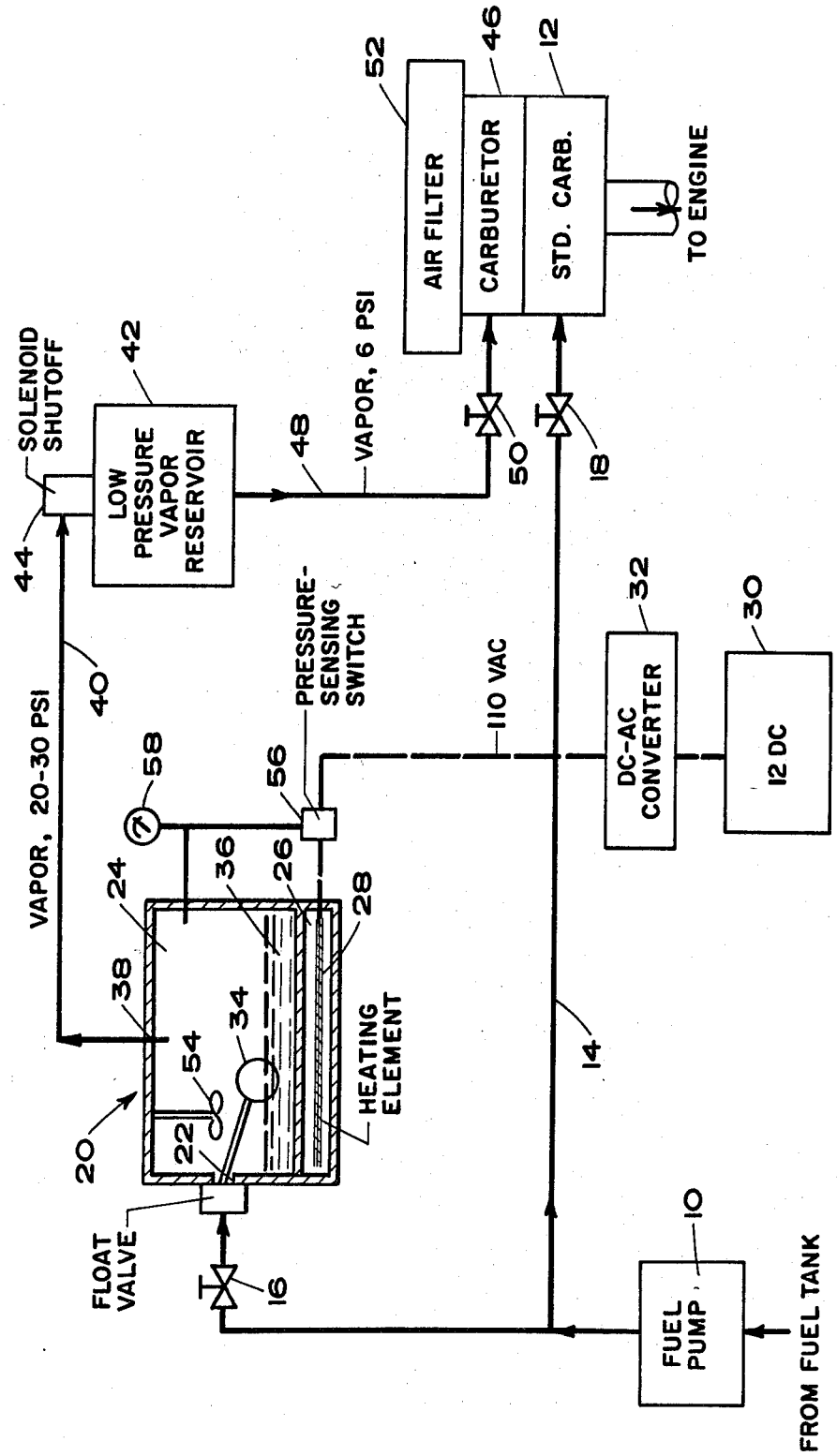

FUEL CONSERVATION DEVICE

BACKGROUND OF THE INVENTION

1. Field of the Invention

This invention relates to improvements in fuel conservation devices and more particularly, but not by way of limitation, to a fuel conservation device which delivers substantially completely vaporized fuel to the combustion chamber of an internal combustion engine.

2. Description of the Prior Art

In the usual internal combustion engine in use today utilizing gasoline liquid petroleum gas (LPG) as a fuel, or the like a carburetor is normally provided for converting liquid fuel to an air-fuel mixture for facilitating the burning of the fuel in the combustion chamber of the engine. The carburetor is normally secured in the proximity of an intake manifold which receives the air-fuel mixture for distribution thereof to each of the engine cylinders. The carburetor normally functions to regulate the quantity of fuel flowing therethrough and to mix air with the fuel in order to provide at least a partial vaporization of the fuel. It has been recognized that the greater the vaporization of the liquid fuels, the greater the combustion efficiency of the fuel. The combustion efficiency not only increases the efficiency use of the fuel, but also reduces the emission of pollutants in the engine exhaust gases. One of the methods of increasing fuel vaporization which has been utilized is the addition of heat to the fuel, and although this does provide an efficient vaporization of the fuel for an increased fuel efficiency, most of the devices presently available for heating of the fuel are expensive, and require somewhat extensive modification of the existing equipment normally present in the internal combustion engine.

SUMMARY OF THE INVENTION

The present invention contemplates a novel fuel conservation device which has been particularly designed and constructed for overcoming the foregoing disadvantages. The novel device may be quickly and easily installed between the usual fuel pump and the normal carburetor of the presently available internal combustion engine with a minimum of alteration of the previously installed equipment. A suitable valve is interposed in the fuel line downstream of the fuel pump and a second similar valve is interposed in the fuel line upstream of the carburetor whereby the portion of the fuel line between the valves may be selectively isolated from the flow of fuel. A housing having two independent or separate compartments is connected between the two valves, the housing being provided with two separate or independent compartments therein. One of the compartments is provided with a suitable heating means, and the other of said compartments is provided with an inlet port in communication with the fuel pump for receiving raw fuel therefrom, and an outlet port for discharge of vaporized fuel therefrom. An auxiliary carburetor is mounted above the original carburetor and in communication with the outlet port of the housing for receiving the vaporized fuel therefrom and directing the vapor to the normal carburetor under suitably controlled conditions for efficient use of the vapor through the carburetor and into the engine manifold, whereupon the operation of the internal combustion engine continues normally. The heating means in the first compartment of the housing provides heat for the second compartment of the housing, and the raw fuel is delivered into the second compartment from the fuel pump. A suitable level control device is provided for control of the depth of fuel within the second compartment, and suitable thermostatic means is provided for controlling the heat within the compartment for precluding accidental firing of the fuel therein. The fuel within the heated compartment is vaporized and the vapor is discharged from the compartment for passage into the auxiliary carburetor which assures that the pressure of the vapor being delivered to the standard carburetor will be maintained within the working limits thereof. Since the fuel delivered to and through the standard carburetor is substantially completely vaporized, the combustion thereof is substantially one hundred percent, which not only greatly increases the fuel efficiency, but also substantially precludes the release of pollutants in the engine exhaust gases. The novel fuel conservation device is simple and efficient in operation and economical and durable in construction.

BRIEF DESCRIPTION OF THE DRAWING

The drawing is a schematic view of a fuel conservation device embodying the invention.

DETAILED DESCRIPTION OF THE PREFERRED EMBODIMENT

Referring to the drawings in detail, reference character 10 indicates the usual fuel pump normally utilized in a present date internal combustion engine (not shown) for receiving raw fuel from a fuel tank (not shown). The fuel pump 10 is normally in communication with a standard carburetor 12 through a fuel line 14 for delivering the fuel to the carburetor during operation of the engine (not shown). A suitable valve 16, such as commonly known as a lock-off and in widespread use in combination with LPG installations, is interposed in the fuel line 14 downstream of the fuel pump 10, and a similar valve 18 is interposed in the fuel line 14 upstream of the carburetor 12. The valves 16 and 18 may be electrically actuated and may be operably connected with the electrical system of the vehicle (not shown) with which the engine is utilized, and may be actuated selectively by the operator of the vehicle in order to place the novel fuel conservation device of the invention in use. For example, the valve 18 may be closed simultaneously with the opening of the valve 16, thus interpreting the flow of the raw fuel into the carburetor 12 and directing the fuel into a housing 20 through a suitable inlet port 22.

The housing 20 is provided with two separate or independent compartments 24 and 26 therein. A suitable heating element 28 is disposed in the compartment 28, and if the heating element 28 is an electrical device, it may be preferable that the element 28 be operably connected with the battery 30 of the vehicle (not shown) through a suitable DC-AC converter 32 which converts the voltage (normally twelve volt DC current) to 110 AC current. A suitable level control device, such as a float valve 34, is secured in the compartment 24 for controlling the depth of fuel 36 within the compartment 24 by controlling the flow of fuel through the inlet 22 as is well known. An outlet port 38 is provided in the compartment 24 for discharge of vapor therefrom, and the vapor is directed through a suitable conduit or line 40 to a suitable low pressure vapor reservoir 42 through a solenoid shutoff valve 44. The vapor reservoir functions for storing the vapor at a preselected pressure, such as six pounds per square inch, and the relatively low pressure vapor is directed from the reservoir 42 into an auxiliary carburetor 46 through a conduit or line 48. It is preferable to interpose a suitable control valve 50 in the line 48 upstream of the carburetor 46.

The carburetor 46 may be of any suitable type, but is preferably a vapor carburetor such as normally utilized in connection LPG applications. It is also preferable to provide the usual air filter apparatus 52 outboard of the carburetor 46 for cleaning of the air passing into the carburetor, and the carburetor 46 is in open communication with the throat (not shown) of the standard carburetor 12 for directing the vaporized fuel thereto.

In use, the internal combustion engine (not shown) may be utilized in the usual or standard manner, if desired, and when it is desirable to interpose the fuel conservation device of the invention in the engine system, the valves 16 and 18 may be activated as hereinbefore set forth for closing the valve 18 and opening the valve 16. The raw fuel is then directed into the chamber 24 through the inlet port 22. The heating element 28 may be activated for transmitting heat to the chamber 24, and since the depth of the fuel in the chamber 24 is controlled to a preselected dimension, preferably approximately one inch in depth, but not limited thereto, the fuel will be vaporized by the heat in the chamber 24. Of course, it is preferable to provide a suitable thermostat 54 within the chamber 24 operably connected with the heating element 28 in any suitable or well known manner (not shown) for controlling the heat in the chamber to preclude undue heating conditions therein, and it is also preferable to provide a suitable pressure sensing switch 56 in communication with the interior of the chamber 24 through a suitable exterior gauge 58 for controlling the pressure within the chamber 24 as is well known.

The vapor is discharged from the chamber 24 through the line 40 and is accumulated within the reservoir 42 where the pressure is controlled to a preselected upper limit by the solenoid shutoff. It is preferable to provide a vapor pressure of approximately six pounds per square inch within the reservoir 42, and this vapor pressure is transmitted to the vapor carburetor 46 from whence it is directed into the standard carburetor 12 for delivery to the manifold (not shown) of the engine in the usual manner for fuel combustion in the usual manner and for the usual purpose.

It will be readily apparent that substantially completely vaporized fuel is delivered into the combustion chamber of the engine, and as a result there will be substantially one hundred percent combustion of the fuel. In this manner substantially all of the fuel is consumed, and not only is the fuel efficiency greatly increased, but there will be substantially no pollution due to the exhaust gases of the engine. Of course, if it is desired for any reason to remove the novel fuel conservation apparatus from the fuel system of the engine, the valve 16 may be closed and the valve 18 simultaneously opened, thus restoring the normal fuel system operation for the engine.

From the foregoing it will be apparent that the present invention provides a novel fuel conservation device comprising a dual compartment housing interposed between the fuel pump and standard carburetor of an internal combustion engine. One of the compartments is a heating chamber and the other of the compartments is a vaporization chamber. The vaporization chamber is provided with an inlet in communication with the fuel pump for receiving the raw fuel therefrom, and an outlet for discharging the vaporized fuel from the housing. The fuel leaving the vaporization chamber is substantially completely vaporized and is delivered to the standard carburetor through a vapor carburetor. In this manner, substantially vaporized fuel is delivered from the standard carburetor for greatly increasing fuel efficiency and reducing pollutant emission in the engine exhaust gases.

Whereas the present invention has been described in particular to the drawings attached hereto, it should be understood that other and further modifications apart from those shown or suggested herein may be made within the spirit and scope of this invention.

What is claimed is:

1. A fuel conservation apparatus for an internal combustion engine having an electrical system and a fuel pump and a carburetor, said fuel conservation apparatus comprising housing means interposed between the fuel pump and carburetor and having two independent compartments, one of said compartments being a vaporization compartment and the other of said compartments being a heating compartment, said housing having inlet port means providing communication between the vaporization compartment and the fuel pump for selectively directing said raw fuel into the vaporization compartment and outlet port means in communication with the vaporization compartment for discharging vaporized fuel therefrom, electrical heating means provided in said heating compartment and operably connected with the electrical system of the internal combustion engine for hearing the fuel in the vaporization compartment to provide vaporization of the fuel, auxiliary carburetor means interposed between the outlet port means and the carburetor whereby vaporized fuel only may be delivered to power the internal combustion engine, and bypass means connected between the fuel pump and the first mentioned carburetor for selectively bypassing the housing means and auxiliary carburetor means, a first lock off valve means interposed between the inlet port and the fuel pump for providing selective flow of fuel to the housing, and second lock off valve means interposed between the housing and the carburetor for cooperation with the first lock off valve means to remove the fuel conservation apparatus from the internal combustion engine system if desired.

* * * * *